United States Patent [19]

Franklin et al.

[11] 4,167,287
[45] Sep. 11, 1979

[54] ROTATABLE GLARE SHIELD FOR VEHICLES

[76] Inventors: Jim M. Franklin, 1237 Bay Rd., Webster, N.Y. 14580; Gary J. Reed, 160 Wheelock Rd., Penfield, N.Y. 14526; John Van Sickle, 1841 Billington Rd., East Aurora, N.Y. 14052

[21] Appl. No.: 823,647

[22] Filed: Aug. 11, 1977

[51] Int. Cl.² .................................................. B10J 3/00
[52] U.S. Cl. .................................. 296/97 C; 296/97 G
[58] Field of Search ................ 296/97 R, 97 C, 97 G, 296/97 H

[56] References Cited

U.S. PATENT DOCUMENTS

| | | | |
|---|---|---|---|
| 1,894,233 | 1/1933 | Ellis | 296/97 G |
| 1,958,934 | 5/1934 | Williams | 296/97 C |
| 2,458,125 | 1/1949 | Winkler | 296/97 R |
| 2,829,919 | 1/1958 | Bartlett | 296/97 C |
| 3,159,421 | 12/1964 | Samuelson | 296/97 G |
| 3,351,375 | 11/1967 | Wheeler | 296/97 R |
| 3,522,968 | 8/1970 | Honor, Sr. | 296/97 R |
| 3,954,297 | 5/1976 | Linke et al. | 296/97 C |

Primary Examiner—Richard A. Bertsch

[57] ABSTRACT

A glare shield whose body is a sheet of transparent glare reducing material is attached to a vehicle sun visor for use as a downward extension thereof by a clip device having opposed arms engaging the lower portion of the visor from below, one of said arms on its lower outer extremity having a transversely extending partially closed channel for receiving and frictionally engaging a hinge pin attached to said body so as to extend above the central upper marginal edge of said body and parallel thereto by which pin the body is fastened to the clip in hinged relationship and may be rotated from a downward extension of the sun visor to an out-of-the-way position folded back against the visor, and may be used as a vertical downward extension of the visor regardless of its tilt, said arms of the clip being adapted to fit all visors in common use regardless of their thickness.

1 Claim, 18 Drawing Figures

U.S. Patent  Sep. 11, 1979  Sheet 1 of 5  4,167,287
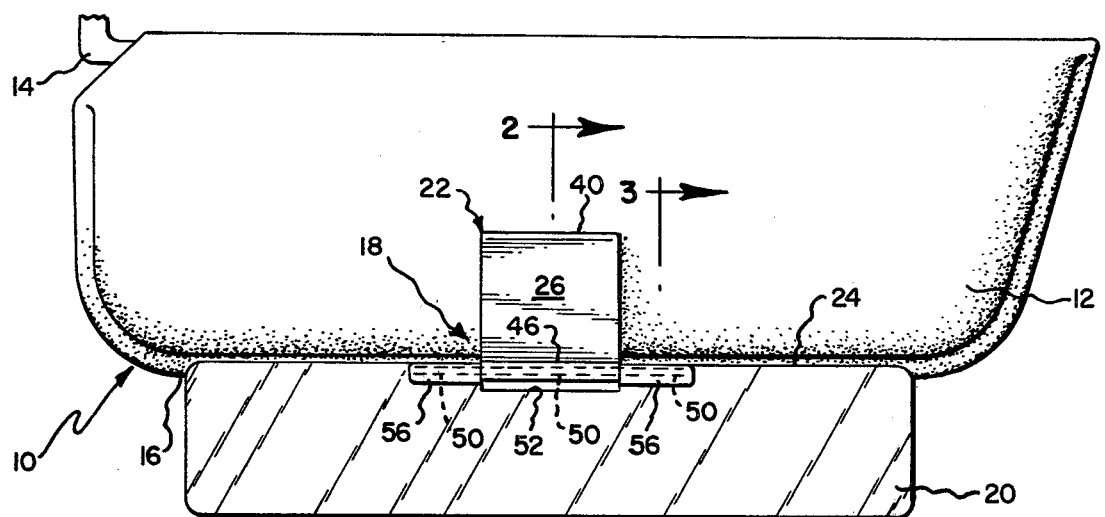
Fig. 1.
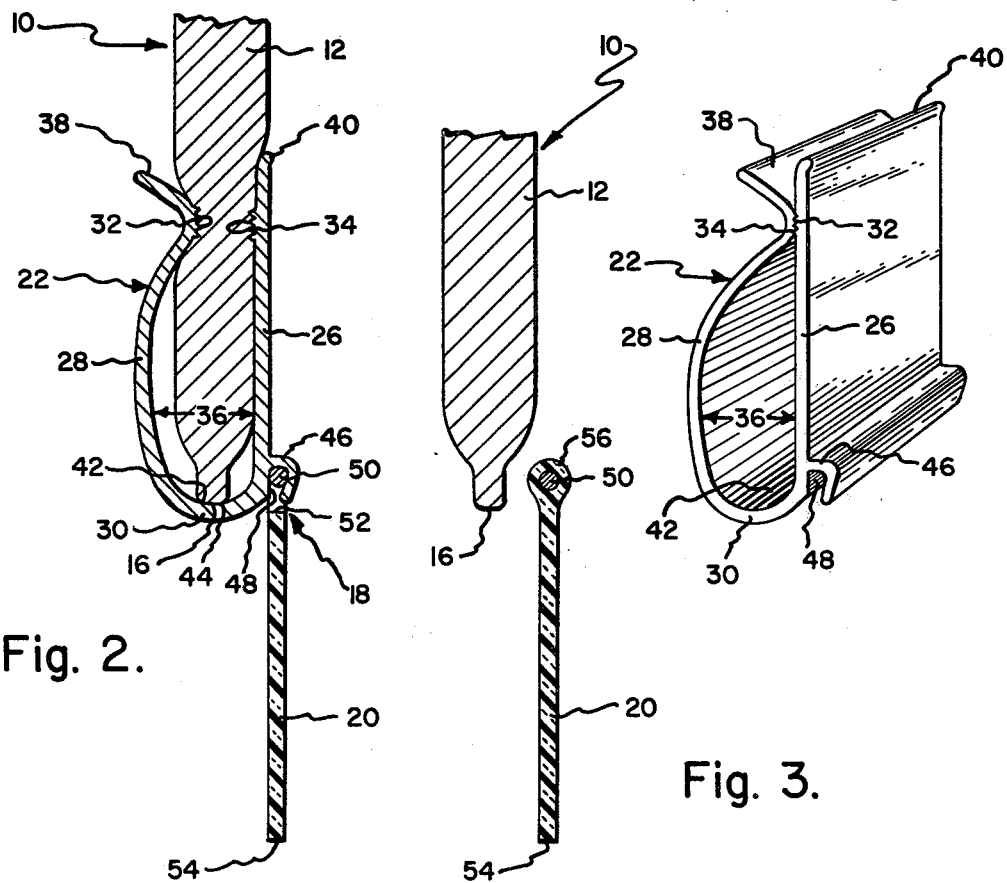
Fig. 2.
Fig. 3.
Fig. 4.

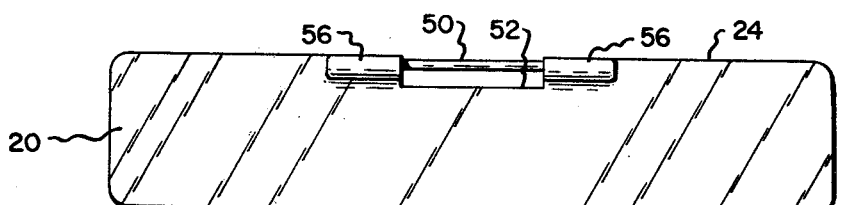
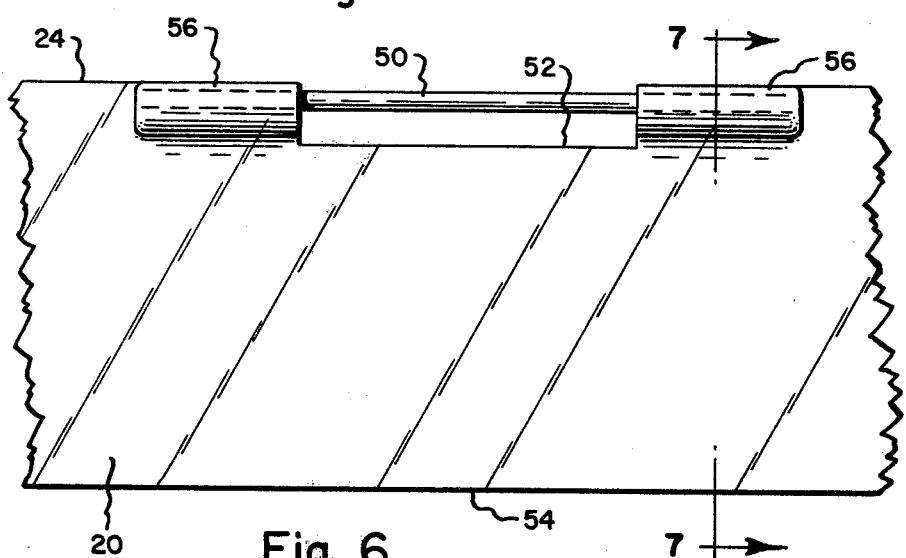
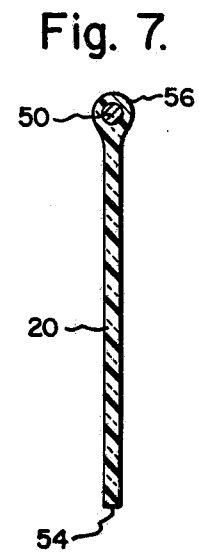
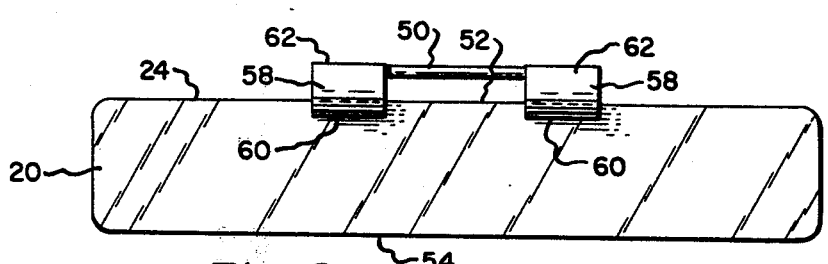
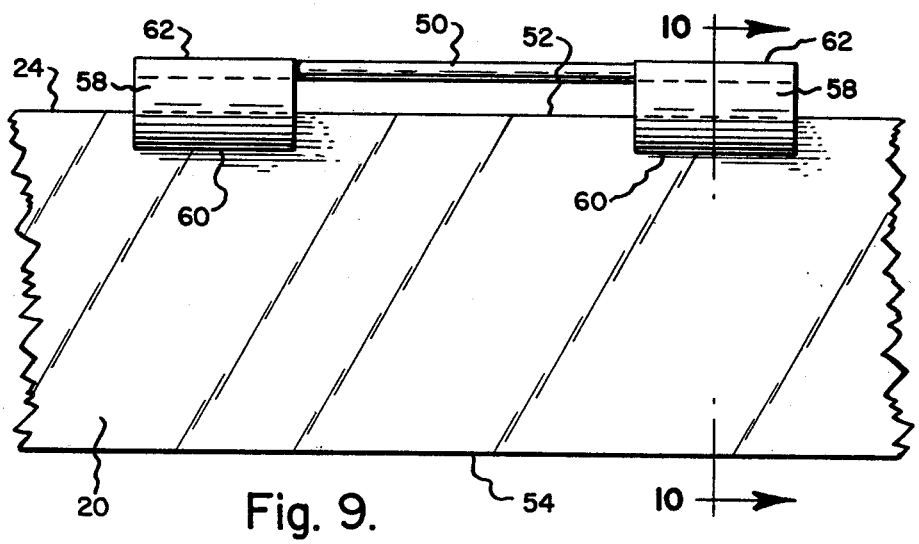
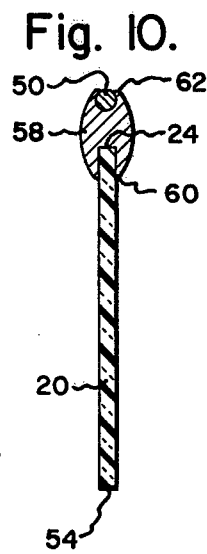

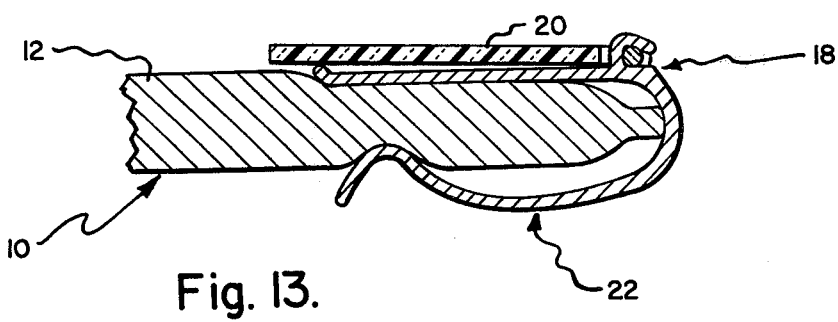
Fig. 13.
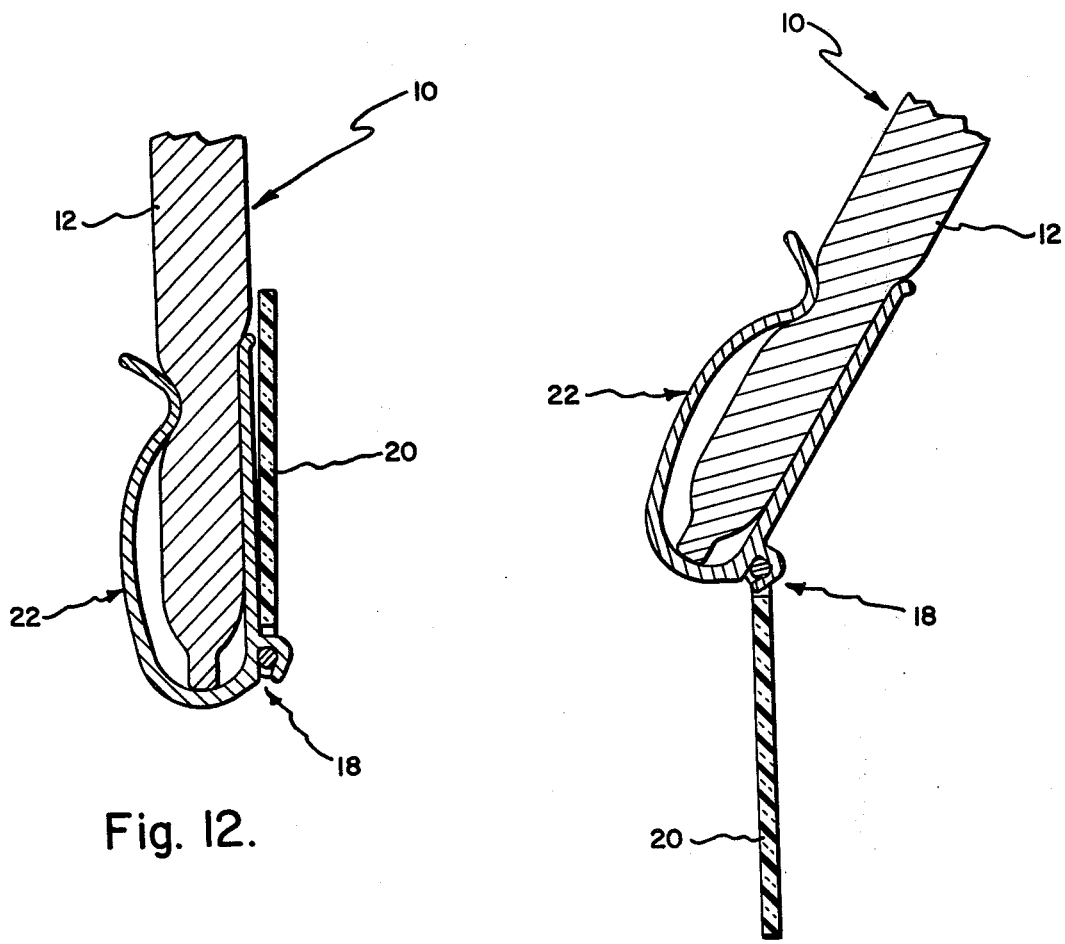
Fig. 12.
Fig. 11.

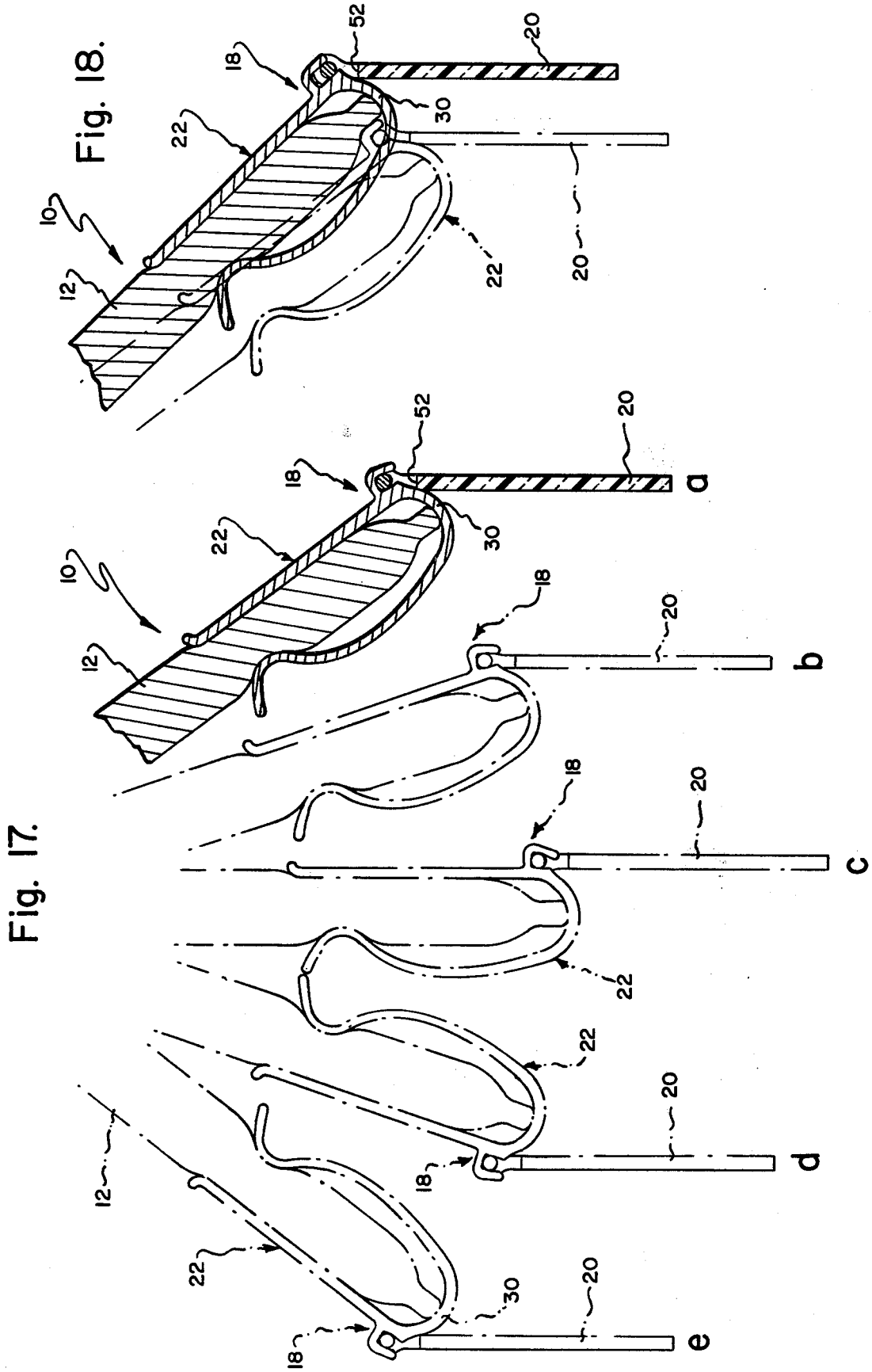

ROTATABLE GLARE SHIELD FOR VEHICLES

BACKGROUND OF THE INVENTION

This invention relates to a glare shield attachment for reducing the glare from headlights and other light sources encountered in driving a motor vehicle, and more particularly to a device combining a sheet of glare reducing material in hinged relationship to a clip for attaching the sheet to a vehicle sun visor as a downward extension of the sun visor.

The prevention of eye fatigue, discomfort and impairment of vision and attendant hazards caused from glare from direct light sources such as headlights of oncoming vehicles, highway lights and road signs and also from reflected light from fog, rain, haze and snow has long been a problem for the motorist. Under the prior art success has been achieved in reducing such glare by the use of a clip holding a body of transparent glare reducing material to a vehicle such visor, disposed in downward position, as a parallel downward extension of the sun visor, such as the devices disclosed in U.S. Pat. Nos. 3,697,125 and 3,858,931. However, the inflexible attachment of the body of the shield to the clip has certain disadvantages. Such devices, when left on the sun visor for convenience, are not entirely out of the way when the sun visor is pushed upward to an out-of-the-way position near the top of the vehicle and are completely in the way when the visor is swung downward for normal use under conditions where the glare shield is not needed. Moreover, when the devices are in use, and it is desired to tilt the visor forward or backward to elevate the lower edge of the visor to accommodte for the height of the driver, the body of the shield also tilts in the plane of the sun visor and cannot be adjusted to a more desirable vertical position. The present invention, by permitting the body of the shield to be rotated on a transverse axis on the clip, overcomes these difficulties. Thus, when the shield is not in use, the body of the shield can be folded back upon the sun visor and placed in an out-of-the-way position near the top of the vehicle. When folded back, the body of the shield will also be out of the way if the visor is swung downward for normal use. When it is desired to put the glare shield in use, it is easily rotated to a desired perpendicular position, irrespective of the tilt of the visor. The frictional resistance built into the hinge holds the body in the selected position.

Previous clips of glare shields of this nature, while having some latitude in fitting visors of different thicknesses, have not been of universal application, regardless of the thickness of the visor. The clip of the present invention is designed to fit all visors now in general use, regardless of their thickness.

SUMMARY OF THE INVENTION

The present invention involves a glare reducing device for attachment to a vehicle sun visor having a substantially horizontal lower edge when downwardly disposed, comprising a clip device of resilient material having a pair of opposed arms engaging and frictionally gripping the lower end of the sun visor, a bight portion joining said arms at their lower ends and maintaining said gripping action, one of said arms having a partially closed channel extending transversely across its outer surface near its lower end receiving and serving as a tightly fitting bearing for a hinge pin whose ends extend beyond the ends of the channel, in combination with a body portion comprising a sheet of transparent glare reducing material generally rectangular in shape with its longer dimension transverse to the direction of the vehicle and having a horizontal centrally located portion of its upper marginal edge of a length coextensive with the length of said channel and abutments on each end of said upper marginal edge portion enwrapping and firmly holding the ends of said hinge pin so that said pin will lie in the plane of said sheet above said centrally located upper marginal edge portion and parallel thereto, said pin being inserted in said channel on said clip, whereby said body portion may be rotated on the axis of said pin in a range from a position as a parallel extension of the sun visor to an out-of-the-way position folded back against the side of the visor on which the channel of the clip is located and held in the desired position by the walls of said channel pressing against said pin to provide frictionally restrained rotation of the pin in the channel, said arms of the clip being spaced apart at their upper portions less than the thickness of the thinnest visors in general use and at their lower portions a distance greater than the thickness of the thickest visors in general use, whereby a universal clip attachment is obtained.

BRIEF DESCRIPTION OF THE DRAWINGS

FIG. 1 is an elevational view showing a glare shield of the present invention attached to a vehicle sun visor.

FIG. 2 is an enlarged vertical section taken along the plane of section line 2—2 in FIG. 1.

FIG. 3 is an enlarged vertical section taken along the plane of section line 3—3 in FIG. 1.

FIG. 4 is an enlarged perspective view of the clip device.

FIG. 5 is a plan view of the body portion of the shield.

FIG. 6 is an enlarged plan view of the central portion of the body portion of the shield.

FIG. 7 is a sectional view taken along the plane of section line 7—7 in FIG. 6.

FIG. 8 is a plan view of an alternative construction of the body portion of the shield.

FIG. 9 is an enlarged plan view of the central portion of the body portion of the shield shown in FIG. 8.

FIG. 10 is a sectional view taken along the plane of section line 10—10 in FIG. 9.

FIG. 11 is a sectional view as in FIG. 2, but with the visor tilted and the body of the shield rotated to a vertical position.

FIG. 12 is a sectional view as in FIG. 2, but with the visor in use without the shield being in operation.

FIG. 13 is a sectional view as in FIG. 2, but with the body of the shield folded back against the visor in horizontal position when not in use.

FIG. 17 a–e shows various sectional views as in FIG. 2, but with the body of the shield rotated more than 180 degrees to close any gap between the upper marginal edge of the body of the shield and lower edge of the bight.

FIG. 18 shows the position of the hinge pin altered in the channel on the clip to provide greater rotation of the body of the shield with relation to the visor.

DESCRIPTION OF THE PREFERRED EMBODIMENT

Figure 14:
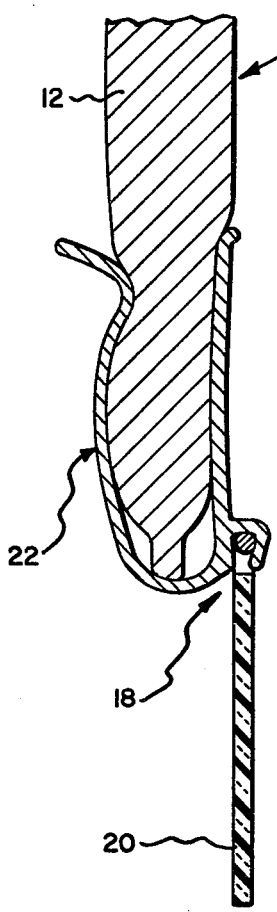
FIG. 14 is a sectional view as in FIG. 2, but showing the clip engaging a thick visor.

Referring now to FIG. 1, the reference numeral 10 indicates in general a vehicle sun visor, such as is standard equipment on automobiles. The main body 12 of the sun visor 10 is provided with a mounting member 14 by means of which the sun visor 10 is pivotally attached to the inside of the vehicle for movement from an out-of-the-way position near the top of the vehicle towards the driver to a dependent vertical position transverse to the direction of the vehicle and forward to an out-of-the-way position near the top of the vehicle away from the driver. The sun visor 10 has a generally horizontal lower edge 16.

The glare shield attachment is indicated generally by the reference character 18 in FIG. 1 and includes a main body portion 20, comprising a sheet of glare reducing material, a hinge pin and abutments for attaching the hinge pin to the sheet, and a clip device 22 for attaching the body of the shield to the body 12 of the visor. The body portion 20 preferably is generally rectangular in shape and is attached to the body 12 of the visor by the clip 22 so as to extend transversely below the lower edge 16 of the visor, preferably with its upper marginal edge 24 overlapping the lower edge 16 of the visor.

As more clearly seen in FIGS. 2 and 4, the clip device 22 comprises opposing arms 26 and 28 which are joined together at their lower ends by the bight portion 30. One of said arms preferably is flat, as is the arm 26, and the other preferably is curved, as is the arm 28. The curved arm 28 together with the bight 30 presents a curved surface with a cross section similar to the shape of the letter "S" as may be observed in FIG. 2. The upper inner surface 32 of the arm 28 where the curve reverses its direction comes close to and preferably contacts the upper inner surface 34 of the arm 26. The distance separating the surface 32 and 34 is less than the thickness of the thinnest visors in general use. The arms 26 and 28 at their lower ends are spaced apart a distance 36, which is greater than the thickness of the thickest visors in general use. The arms of the clip are thus enabled to fit over and hold visors of every thickness in general use. By having one of the arms generally flat and the other generally curved, as aforesaid, stability of the clip in relation to the visor is produced by the inner surface of the flat arm pressing against the generally flat surface of the body 12 of the visor, with the area of contact 32 on the arm 28 pressing in opposition to the arm 26. It has been found desirable to locate the area of contact 32 on the arm 28 so as to oppose the inner surface of the arm 26 about a quarter of the way down from the top of the arm 26. To locate said area of contact further down would shorten the portions of the arms to be sprung by the insertion of a visor, thus restricting the opening capacity of the clip, and to locate the area of contact further up would lessen the stabilizing effect of the flat arm 26 pressing against the body 12 of the visor. The upper part 38 of the arm 28 extends outwardly to aid in placing the clip over the lower portion of the body 12 of the visor. For the same purpose the upper part 40 of the arm 26 also extends outwardly, but to a lesser extent.

The areas of contact 32 and 34 may be serrated as shown in FIGS. 2 and 4 to improve the grip of the arms 28 and 26 on the body 12 of the visor.

In FIGS. 2 and 4 the bight portion 30 is seen to present an upwardly facing seating surface 42 which engages the lower edge 16 of the sun visor as indicated at 44. This engagement is maintained by the gripping of the visor by the arms 26 and 28 at their upper free end portions, holding the clip snugly up against the lower edge 16 of the sun visor, thereby to further stabilize the clip with respect to the sun visor.

As shown in FIGS. 2 and 4 the wall 46 extends outwardly from the lower end of the arm 26 and bends downwardly and inwardly to form with the outer surface 48 of the bight portion 30 and lower end of the arm 26 a downwardly facing partially closed channel which receives the central portion of the metal hinge pin 50 seen in FIGS. 5 and 6, the walls of the channel being slightly less in diameter than the diameter of the hinge pin so as to press tightly against the hinge pin and hold it firmly to the clip, but to permit frictionally restrained rotation of the pin within the channel.

The wall 46 makes a raised ridge running transversely across the lower outer portion of the arm 26 which, in conjunction with the raised outer surface of the arm 28, provides a helpful means for gripping the shield while attaching it to or removing it from the sun visor.

The main body portion 20 of the shield is separately shown in FIG. 5. It will be noted that the central portion 52 of the upper edge 24 of the body of the shield is downwardly recessed, as indicated in FIGS. 5 and 6. This permits the remaining portions of the edge 24 to overlap the lower edge 16 of the sun visor, as indicated in FIG. 1, thereby eliminating a distracting gap that would otherwise exist between the top of the body 20 and the lower edge 16 of the visor. The edge 52 is parallel with the lower edge 54 of the body 20, and has a width or transverse extent slightly greater than the width of the clip 22. At each end of the edge 52 are abutments 56 comprising a thickening enlargement of the upper portion of the body 20, as shown in FIG. 7. Embedded within the abutments 56 are the ends of the hinge pin 50, which lies in the plane of the body 20 and extends above the recessed edge 52 and parallel to it. This construction of the body 20 is readily accomplished by injection molding whereby the ends of the metal hinge pin 50 are rigidly embedded into the mold of the plastic portion of the body 20 at the abutments 56.

An alternative construction of the body portion 20 of the shield is shown in FIGS. 8 and 9. The ends of the hinge pin 50 are attached to the body portion 20 by means of double channeled clips 58 of resilient material best shown in FIG. 9. The bottom edge 60 of the clip 58 is contoured to form a channel to receive the upper edge of the body 20 and has side walls spaced apart slightly less than the thickness of the body 20, whereby the body 20 is tightly held by the clip. The top edge 62 of the clip is contoured to form a channel to receive an end of the hinge pin 50 and has an inside diameter slightly less than the diameter of the hinge pin 50, whereby an end of the hinge pin is tightly held. The channel openings on the clip are diametrically opposed. A clip 58 is placed on the body 20 at each end of the edge 52 to hold the hinge pin 50 in the plane of the body 20 above the edge 52 and parallel to it. This construction of the body 20 is used when the flat transparent glare reducing portion of the body 20 is made of prefabricated sheet material, such as Plexiglas, rather than being injection molded.

The body portion 20 is attached to the clip 22 by forceably inserting the hinge pin 50 into the channel on the clip formed by the inner surface of the wall 46 and the surface 48. The channel walls tightly grip the hinge pin and hold the body portion 20 in firm attachment to the clip 22, but permit the hinge pin to rotate yieldingly within the channel. The range of rotation of the body portion 20 on the axis of the hinge pin 50 extends beyond 180 degrees until the edge 52 strikes the bight 30. This permits the body portion 20 to be rotated from a position as a parallel extension of the sun visor, as shown in FIGS. 1 and 2, to a position where it is folded back against the side of the visor on which the arm 26 is placed, or any intermediate position. The frictionally restrained rotation of the hinge pin within the channel on the clip keeps the body of the shield in the selected position with relation to the sun visor. Thus, when the shield is attached to the sun visor with the flat arm facing the driver, the operator may place the body of the shield in a desired vertical position when the visor is tilted forward for accommodate for the height of the driver, as shown in FIG. 11, or fold the body of the shield back against the visor when it is desired to use the visor without the shield, as shown in FIG. 12, or place the visor and shield in an out-of-the-way horizontal position against the top of the vehicle towards the driver when not in use, as shown in FIG. 13. In some cases the distance between the driver and the visor may such that the driver would prefer to tilt the visor backwards towards himself to elevate the bottom of the visor, rather than tilting it forward. In this situation the body of the shield may be rotated to a desired vertical position if the shield is attached to the visor with the curved arm facing the driver, and may be folded back against the top of the visor near the top of the vehicle when the visor is swung forward to a horizontal position.

Figure 15:
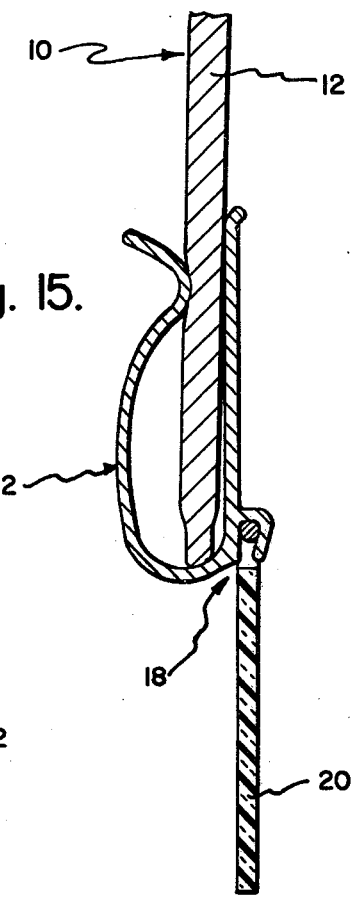
FIG. 15 is a sectional view as in FIG. 2, but showing the clip engaging a thin visor.
Figure 16:
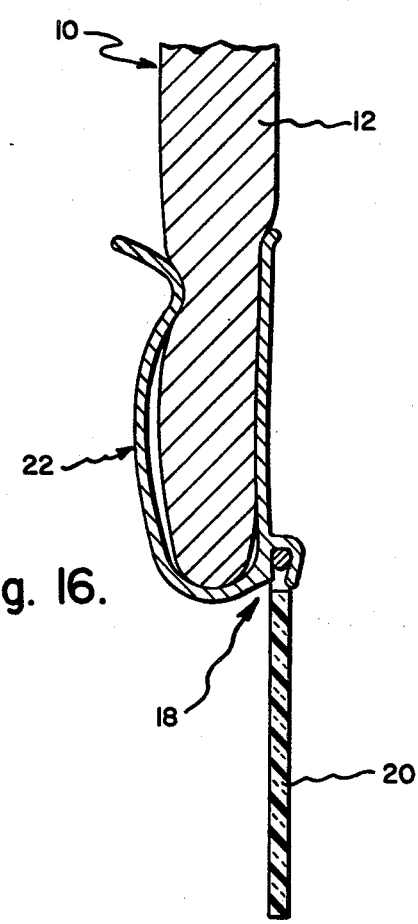
FIG. 16 is a sectional view as in FIG. 2, but showing the clip engaging a visor with a beadless rounded lower edge.

The clip is seen engaging a thick visor in FIG. 14, a thin visor in FIG. 15, and a beadless visor with rounded lower edge in FIG. 16.

When the clip device is attached to the sun visor with the flat arm facing the driver and the visor is tilted towards the driver with the body of the shield rotated more than 180 degrees from a flat position against the visor, the edge 52 will be seen to overlap the bight 30, thus eliminating the distracting gap which would otherwise exist between the edge 52 and the bight 30. Such rotation beyond 180 degrees may proceed until the edge 52 strikes the bight 30, as is shown in FIG. 17 a. FIG. 17 b shows the visor tilted towards the driver to a lesser extent and the body of the shield rotated beyond 180 degrees to a vertical position, but less than in FIG. 17 a, with an overlapping of the edge 52 over the bight 30. FIG. 17 c shows the visor and shield in vertical position, with an overlapping of the edge 52 over the bight 30. When the visor is tilted slightly forward of a vertical position, a gap will appear between the edge 52 and the bight 30. This may be eliminated by attaching the shield to the visor with the curved arm facing the driver. FIG. 17 d shows this attachment, with the visor tilted slightly forward and the body of the shield rotated more than 180 degrees to a vertical position, and the edge 52 being obscured by the bight 30. FIG. 17 e further shows this attachment, with the visor tilted forward and the edge 52 striking the bight 30 when the body of the shield is in a perpendicular position, and the edge 52 being obscured by the bight 30.

Further rotation beyond 180 degrees is obtained by the hinge pin moving within the channel on the clip to a lower transverse position, as permitted by the arms of the channel. FIG. 18 shows in broken lines the position of the visor in FIG. 17 a, and in solid lines the visor tilted further towards the driver with the hinge pin positioned lower in the channel, the body of the shield being in a perpendicular position and the edge 52 striking the bight 30.

Thus, as is illustrated in FIGS. 17a–e and in FIG. 18, the glare shield may be positioned by tilting the sun visor to a position in which the lower edge of the sun visor is at the desired height relative to the operator's eyes in order to obtain unobstructed vision of the road ahead, at the same time preventing the occurrence of any visible gap between the upper marginal edge of the glare shield and the lower edge of the sun visor or the lower extremity of the bight of the clip device. Such angular adjustments and reversible positioning of the clip on the visor may be effected by the operator to suit his requirements both as to the height of the lower edge of the sun visor and the relative forward spacing of the glare shield, without incurring the penalty of a visible gap. In practice, such gap is to be avoided because of the distraction caused thereby. For example, the presence of a gap tends to cause an involuntary, periodic focussing of the operator's eyes on the glare shield gap rather than on the road ahead. This involuntary action can be tiring and is also dangerous inasmuch as full attention is not focused on the roadway and any traffic moving thereon or adjacent thereto.

We claim:

1. In combination with a vehicle sun visor having an opaque body disposed in downward position so as to present a substantially horizontal lower edge portion,
  a glare shield comprising a body of transparent glare reducing material having a horizontal upper marginal edge portion, and
  a single clip device pivotally connecting said glare shield to the lower edge portion of the visor for movement between an upwardly swung stored position and a downwardly swung position in which the glare shield depends from said lower edge portion of the visor, said clip device being resilient and comprising a pair of opposed arms straddling said body of the visor from below and having upper free end portions engaging and frictionally gripping the body of the sun visor therebetween, and a bight portion joining the lower ends of said arms,
  said glare shield having a centrally disposed notch in said upper marginal edge portion which defines a downwardly stepped edge portion parallel to but below said upper marginal edge, and said glare shield including a hinge pin bridging said notch at the level of said upper marginal edge, the opposite ends of the hinge pin projecting into and being embedded within said upper marginal edge portion of the glare shield body on either side of said notch with an exposed intermediate portion of said hinge pin lying parallel to but spaced from said downwardly stepped edge portion, said clip device including a wall extending transversely of one of said arms on the outer side thereof adjacent the juncture of said bight portion therewith and defining a channel in conjunction with said outer side of the one arm which is of a width less than the thickness of said hinge pin, said exposed intermediate portion of the hinge pin being snap-fitted and retained in said channel and said bight portion being of a width substantially the same as the length of said exposed intermediate portion of the hinge pin and extending therebelow a sufficient distance to extend below said downwardly stepped edge portion.

* * * * *